Figure 4:
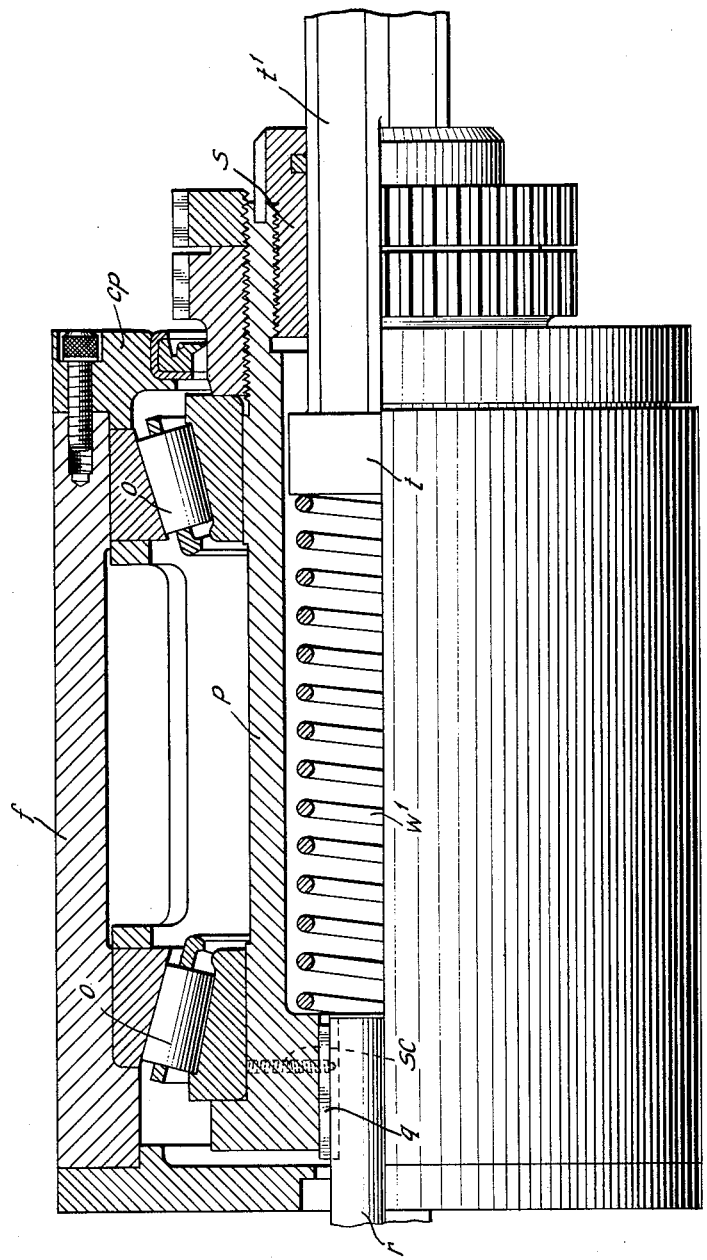

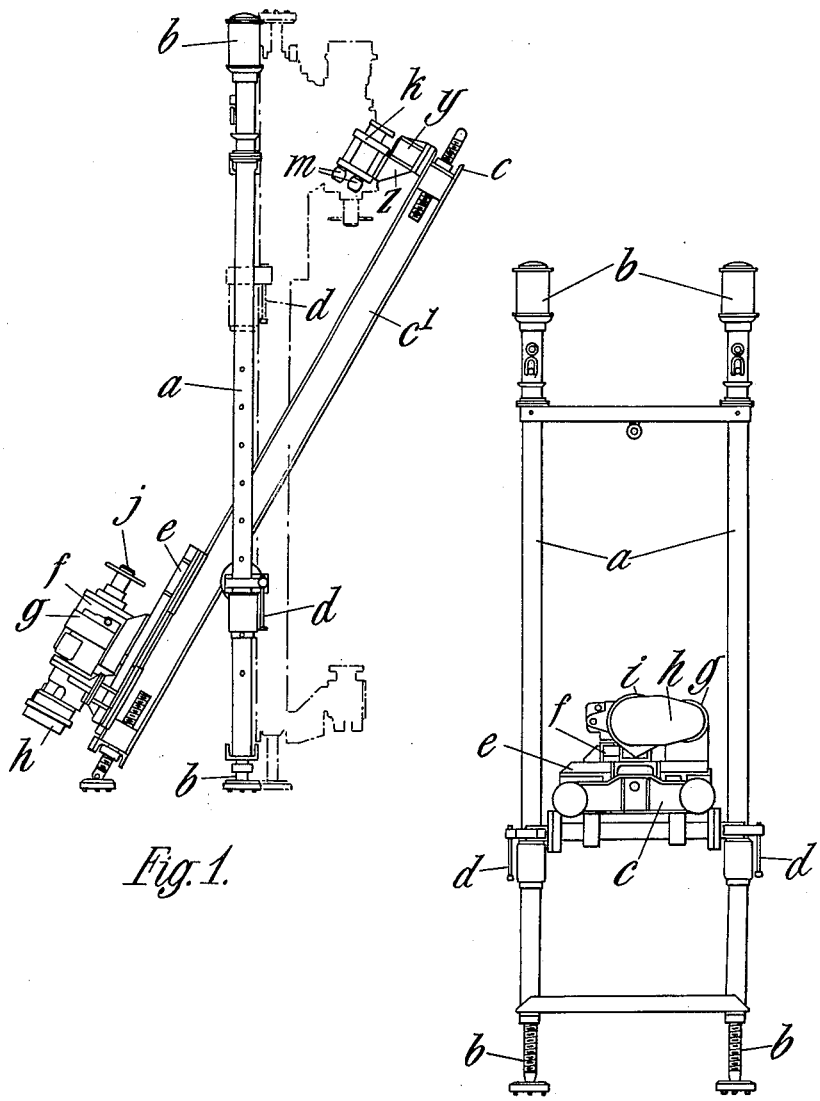

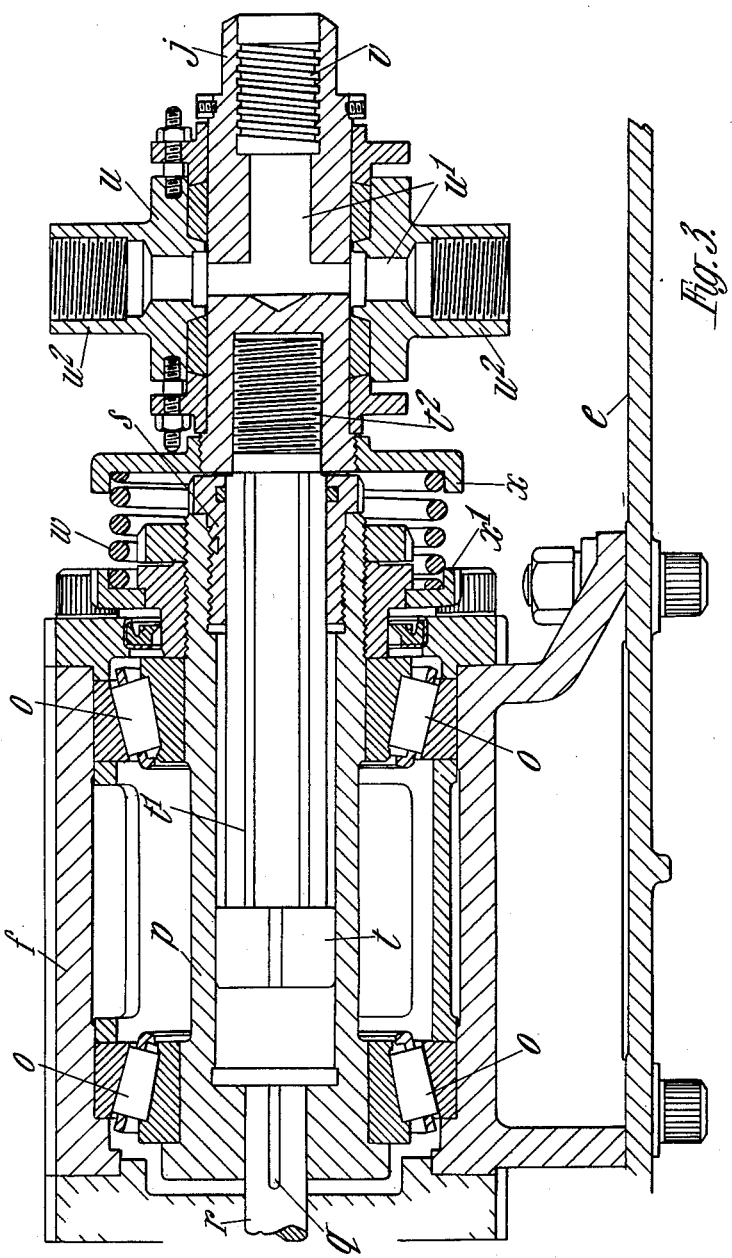

United States Patent Office 3,138,212
Patented June 23, 1964

3,138,212
COUPLING OR UNCOUPLING APPARATUS FOR DRILL RODS OF DRILLING APPARATUS
Frank Walmsley, Reginald Henry Procter, and Frederick Henry William Sanders, all of London, England, assignors to English Drilling Equipment Company Limited, London, England
Filed Jan. 16, 1961, Ser. No. 82,980
5 Claims. (Cl. 173—164)

This invention relates to boring or drilling apparatus used for earth, rock and like boring or drilling operations.

Apparatus with which the invention is concerned employs a support or base frame for feeding a rotary drill head which provides a rotary motion for a "string" of drill rods as they are fed by the feeding movement of the drill head along the base frame. The drill head has a rotatable screw-threaded nosepiece for receiving the screw-threaded end of a drill rod.

When coupling or uncoupling drill rods (making or breaking the drill rod string) the drill rod string is held stationary by a rod clamp positioned at the end of the base frame, and the drill head, with its nosepiece slowly rotating in the appropriate direction, is slowly moved in the appropriate direction along its base frame until the nosepiece is screwed upon or unscrewed from the screw-threaded end of the drill rod. During this operation it is important that the rate of feed of the drill head along the base frame be controlled by the operator to suit the pitch of the rod joint screw thread. In practice however, there is some difficulty is satisfactorily controlling such speed and this results in damage to the drill rod or in stripping or damage of the screw thread on the rod or nosepiece or both.

An object of the invention therefore is to facilitate the coupling or uncoupling of the drill rods.

Earth and like boring or drilling apparatus constructed according to the invention comprises a drill head support, a drill head mounted for movement along said support for applying a feeding movement to a drill rod rotated by said drill head, and coupling means carried by said drill head for coupling the drill rod to the drill head, said coupling means being mounted for rotation upon said drill head and for movement in an axial direction relative to the drill head to facilitate coupling or uncoupling of the coupling means and the drill rod.

In the accompanying drawings, which illustrate one convenient form of the invention as applied by way of example to earth boring and drilling apparatus for use in underground workings;

FIGURE 1 is a side elevation of the apparatus,
FIGURE 2 is a front elevation of the apparatus,
FIGURE 3 is a vertical cross-section on a larger scale through a portion of the drill head,
FIGURE 4 is a view similar to FIGURE 3 but showing a modification of the drill head.

As shown in FIGURES 1 and 2 there is provided an erection frame $a$ of rectangular construction with adjustable jacks $b$ on its top and bottom members for suitably positioning and securing the frame between ceiling and ground levels of the underground working or heading.

Pivotally mounted between the side members of the erection frame $a$ is a drill base frame or support $c$ which is adjustable for position along the side members of the erection frame and pivotable to any desired angle of inclination in which it may be secured by any suitable means such as indicated at $d$.

The drill base frame has side channel members $c'$ upon which is mounted for feeding movement therealong a carriage $e$ supporting a rotary drill head $f$. The latter is powered by any suitable form of prime mover, such as for example a compressed air motor indicated at $g$ operating through a gear chain $h$ and a change speed gear box $i$, and provides the rotary motion for a "string" of drill rods (not shown) attached at one end to a nosepiece $j$ of the drill head.

A rod clamp $k$ (for use when coupling or uncoupling the drill rods and removing or inserting a new length of drill rod in the string) is fitted at one end of the base frame $c$, and is provided with rollers $m$ which are suitably mounted for rotation about support spindles and which act as supporting and guiding means for the string of rotating drill rods as they are fed forward through the rollers and clamp by the feeding movement of the drill head.

Referring now particularly to FIGURE 3, rotatably mounted within the casing of the drill head $f$ by tapered roller bearings $o$ is a cylinder forming member $p$. The latter is connected for rotation by a key $q$ to a shaft $r$ which is driven by the motor $g$ through the gear chain $h$ and gear box $i$.

The cylinder $p$ projects at one end through the drill head casing and has screw-threaded therein a bush $s$, the inner bore of which is of hexagonal form in cross-section. Within the cylinder $p$ is a sliding member or slider $t$ which has a connecting rod $t'$ of hexagonal form in cross-section to conform with the hexagonal bore of the cylinder bush $s$ through which the rod slides. The outer end of the rod $t'$ has a screw-threaded projecting portion $t^2$ for connecting it to the body of the nosepiece $j$ previously referred to, the latter being mounted for rotation within a water swivel member $u$ supplying flush water through passages $u'$ to the drill rods during the drilling operation. The member $u$ has projecting portions $u^2$ adapted for connection to water supply pipes supplying water from any suitable source. The nosepiece $j$ provides a coupling member for coupling one end of the drill rod string to the drill head, and for this purpose it is as shown, provided with a screw-threaded portion $v$ at one end for receiving the complementary screw-threaded end of the drill rod string (not shown).

By the above arrangement it will be appreciated that the nosepiece $j$ is provided with a limited amount of movement in an axial direction by means of the slider and cylinder unit construction. At the same time, the power shaft $r$ may rotate the cylinder $p$ which, through its hexagonal bush $s$ and the rod $t'$, rotates the nosepiece $j$.

In operation, with the drill rod string clamped by the rod clamp $k$ on the base frame $c$, the drill head feed movement is supplemented by the free sliding movement of the nosepiece $j$ relative to the drill head $f$, the nosepiece when coupling up being free to slide forward to screw itself on the drill rod without the previous disadvantage of "jacking" the whole drill head and carriage forward. Similarly, when uncoupling, the nosepiece on reverse rotation is free to slide backward to unscrew itself off the drill rod. A suitable distance for free sliding movement of the nosepiece is approximately equivalent in length to twice the length of a drill rod screw-thread joint.

In certain circumstances, for example, when drilling at an angle with the base frame inclined above the horizontal, it may be advantageous to provide spring means acting to load the nosepiece to balance the weight of the nosepiece, water swivel and one drill rod. As shown this spring means may take the form of a coiled spring $w$ surrounding the projecting end of the cylinder $p$ and acting between a cup member $x$ on the nosepiece $j$ and a cup member $x'$ mounted on the cylinder end.

FIGURE 4 illustrates a modification wherein the spring is positioned within the cylinder behind the slider and in which parts corresponding to those shown in FIGURE 3 bear the same reference characters.

In this embodiment, a set screw sc secures the key q to the shaft r and the cylinder p projects at one end through an aperture in cover plate cp of the drill head casing f and the threaded end of the rod $t^1$ of the slider t is adapted to be connected to the body of the nose piece in the manner previously described.

Coiled spring $w^1$ is located within the bore of the cylinder p with one end bearing against the end of the slider t and the other end bearing against the closed end of the cylinder. This spring means also provides resilience in the drill rod string which permits a spring or clipping action when inserting a new rod length prior to coupling up.

The rod clamp k, which clamps the drill rod string when coupling or uncoupling the drill rods, is secured to the end of the drill head base frame c by a supporting frame structure y which has a bracket portion z to which the clamp k is secured.

We claim:
1. Coupling or uncoupling apparatus for drill rods of drilling apparatus comprising a drill head support, drill rod clamping means mounted on said support, a drill head mounted for movement along said support for applying a feeding movement to the drill rod, rotatable means mounted for rotation in said drill head, power driven means for imparting rotary motion to said rotatable means, slider means slidable within said rotatable means, means interconnecting the rotatable means and the slider means whereby said rotatable means transmit rotary motion to said slider means, and a coupling member secured to and thereby rotatable and axially movable with said slider means such that, with the drill rod clamped by said clamping means, it can couple or uncouple itself to or from a complementary coupling portion of the drill rod end.

2. Coupling or uncoupling apparatus for drill rods of drilling apparatus comprising a drill head support, drill rod clamping means mounted on said support, a drill head mounted for movement along said support for applying a feeding movement to the drill rod, a cylinder member mounted for rotation in said drill head, power driven means for imparting rotary motion to the cylinder member, a slider unit slidable within the bore of said cylinder, means interconnecting the cylinder member and the slider unit whereby the cylinder member may transmit rotary motion to said slider unit, and a screw-threaded coupling member secured to and thereby rotatable and axially movable with said slider unit such that, with the drill rod clamped by said clamping means, it can thread itself on or off a complementary screw threaded end of the drill rod.

3. Coupling or uncoupling apparatus as claimed in claim 2, having the slider unit comprising a slider portion fitting the bore of the cylinder member, and a connecting rod connecting said slider portion to the coupling member, said connecting rod receiving rotary motion from the cylinder member through a bush secured within an open end of the cylinder member, and the cross-sections of the connecting rod and a bore of the bush being of polygonal form such that the connecting rod may slide through the bush and be rotated by the cylinder member.

4. Coupling or uncoupling apparatus as claimed in claim 2, having spring means surrounding an end of the cylinder member projecting beyond the drill head, said spring means acting between flange members on the cylinder member and coupling member to load the coupling member and thereby balance the weight of the latter and the drill rod when drilling at an angle to the horizontal.

5. Coupling or uncoupling apparatus as claimed in claim 2, having spring means located within the cylinder member and acting between a closed end of the cylinder and the end of the slider unit to load the latter and thus the coupling member and thereby balance the weight of the latter and the drill rod when drilling at an angle to the horizontal.

References Cited in the file of this patent

UNITED STATES PATENTS

| | | |
|---|---|---|
| Re. 19,185 | Kingsbury | May 29, 1934 |
| Re. 23,842 | Moore | June 29, 1954 |
| 1,932,068 | Englebright et al. | Oct. 24, 1933 |
| 2,030,007 | Kingsbury | Feb. 4, 1936 |
| 2,237,905 | Haffling | Apr. 8, 1941 |
| 2,292,867 | Charles | Aug. 11, 1942 |
| 2,589,159 | Stone | Mar. 11, 1952 |
| 2,633,333 | Storm | Mar. 31, 1953 |
| 2,797,066 | Sewell | June 25, 1957 |
| 2,854,216 | Bjalme | Sept. 30, 1958 |
| 2,976,943 | Curtis | Mar. 28, 1961 |

FOREIGN PATENTS

| | | |
|---|---|---|
| 167,174 | Australia | Nov. 25, 1950 |